US011310708B2

(12) United States Patent
Han et al.

(10) Patent No.: US 11,310,708 B2
(45) Date of Patent: Apr. 19, 2022

(54) COMMUNICATION METHOD, ACCESS NETWORK DEVICE, CORE NETWORK DEVICE, AND USER EQUIPMENT

(71) Applicant: HONOR DEVICE CO., LTD., Guangdong (CN)

(72) Inventors: Feng Han, Shanghai (CN); Yinghao Jin, Shanghai (CN); Hong Li, Shanghai (CN); Wei Tan, Shanghai (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 16/503,278

(22) Filed: Jul. 3, 2019

(65) Prior Publication Data
US 2019/0327657 A1 Oct. 24, 2019

Related U.S. Application Data

(63) Continuation of application No. PCT/CN2018/071271, filed on Jan. 4, 2018.

(30) Foreign Application Priority Data

Jan. 6, 2017 (CN) .......................... 201710010762.3

(51) Int. Cl.
*H04W 4/00* (2018.01)
*H04W 36/08* (2009.01)
(Continued)

(52) U.S. Cl.
CPC .......... *H04W 36/08* (2013.01); *H04L 5/0055* (2013.01); *H04W 4/029* (2018.02); *H04W 48/16* (2013.01); *H04W 48/18* (2013.01); *H04W 84/042* (2013.01)

(58) Field of Classification Search
None
See application file for complete search history.

(56) References Cited

U.S. PATENT DOCUMENTS

| 10,206,135 | B2* | 2/2019 | Lee | ........................ H04W 88/06 |
| 2011/0143771 | A1* | 6/2011 | Edge | ........................ H04L 67/14 |
| | | | | 455/456.1 |

(Continued)

FOREIGN PATENT DOCUMENTS

| CN | 101330714 A | 12/2008 |
| CN | 101547495 A | 9/2009 |

(Continued)

OTHER PUBLICATIONS

Office Action issued in Japanese Application No. 2019-536910 dated Jul. 7, 2020, 9 pages (with English translation).

(Continued)

*Primary Examiner* — Gerald A Smarth
(74) *Attorney, Agent, or Firm* — Fish & Richardson P.C.

(57) ABSTRACT

Embodiments of the present invention provide a communication method, an access network device, a core network device, and user equipment. One example method includes: sending, by a core network device, a handover request to an access network device, wherein the handover request comprises first information, and the first information comprises an identifier of allowed network slice selection assistance information (NSSAI); and sending, by the access network device, a handover request acknowledgement to the core network device.

18 Claims, 8 Drawing Sheets

(51) Int. Cl.
*H04W 4/029* (2018.01)
*H04L 5/00* (2006.01)
*H04W 48/16* (2009.01)
*H04W 48/18* (2009.01)
*H04W 84/04* (2009.01)

(56) References Cited

U.S. PATENT DOCUMENTS

| | | | | |
|---|---|---|---|---|
| 2014/0086177 | A1* | 3/2014 | Adjakple | H04L 67/10 370/329 |
| 2016/0295398 | A1* | 10/2016 | Ketheesan | H04W 8/02 |
| 2017/0245316 | A1* | 8/2017 | Salkintzis | H04W 76/10 |
| 2018/0035399 | A1* | 2/2018 | Xu | H04W 8/06 |
| 2018/0091967 | A1* | 3/2018 | Gupta | H04W 48/14 |
| 2018/0176858 | A1* | 6/2018 | Wang | H04W 48/16 |
| 2018/0227871 | A1* | 8/2018 | Singh | H04W 60/00 |
| 2019/0045351 | A1* | 2/2019 | Zee | H04W 48/18 |
| 2019/0141606 | A1* | 5/2019 | Qiao | H04W 48/04 |
| 2019/0158360 | A1* | 5/2019 | Xu | H04W 8/02 |
| 2019/0159119 | A1* | 5/2019 | Djordjevic | H04W 8/18 |
| 2019/0313239 | A1* | 10/2019 | Horn | H04L 5/14 |
| 2019/0364496 | A1* | 11/2019 | Jin | H04W 8/08 |
| 2020/0059987 | A1* | 2/2020 | Hong | H04W 72/085 |

FOREIGN PATENT DOCUMENTS

| | | | |
|---|---|---|---|
| EP | 3576457 | A1 | 12/2019 |
| EP | 3576458 | A1 | 12/2019 |
| JP | 2020504553 | A | 2/2020 |
| WO | 2016192636 | A1 | 12/2016 |
| WO | 2018079691 | A1 | 5/2018 |

OTHER PUBLICATIONS

China Mobile, "Clarification of Network Slice ID in Solution 1.6," SA WG2 Meeting #117, S2-165660, Kaohsiung, Taiwan, Oct. 17-21, 2016, 6 pages.

Ericsson, "Solution for selection of a network slice instance," SA WG2 Meeting #116, S2-163338, Vienna, AT, Jul. 11-15, 2016, 4 pages.

Extended European Search Report issued in European Application No. 18736532.5 dated Jun. 25, 2020, 13 pages.

Intel Corporation, "RAN2 impacts on slicing," 3GPP TSG RAN WG2 Meeting #96, R2-168504, Reno, Nevada, Nov. 14-18, 2016, 5 pages.

3GPP TR 23.799 V14.0.0 (Dec. 2016); 3rd Generation Partnership Project;Technical Specification Group Services and System Aspects; Study on Architecture for Next Generation System (Release 14), Technical Report, Dec. 2016, 522 pages.

3GPP TS 23.401 V14.2.0 (Dec. 2016); 3rd Generation Partnership Project; Technical Specification Group Services and System Aspects; General Packet Radio Service (GPRS) enhancements for Evolved Universal Terrestrial Radio Access Network (E-UTRAN) access (Release 14), Technical Specification, Dec. 2016, 385 pages.

3GPP TS 24.301 V14.2.0 (Dec. 2016); 3rd Generation Partnership Project;Technical Specification Group Core Network and Terminals; Non-Access-Stratum (NAS) protocol for Evolved Packet System (EPS); Stage 3 (Release 14); Technical Specification, Dec. 2016, 470 pages.

3GPP TS 36.300 V14.1.0 (Dec. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Technical Specification, Dec. 2016, 317 pages.

3GPP TS 36.304 V14.1.0 (Dec. 2016); 3rd Generation Partnership Project; Technical Specification Group Radio Access Network; Evolved Universal Terrestrial Radio Access (E-UTRA); User Equipment (UE) procedures in idle mode (Release 14), Technical Specification, Dec. 2016, 46 pages.

PCT International Search Report and Written Opinion issued in International Application No. PCT/CN2018/071271 dated Apr. 2, 2018, 13 pages (partial English translation).

R3-161133—Huawei, "Key principles for Support of Network Slicing in RAN," RAN WG3 Meeting #92, Nanjing, China, May 23-27, 2016, 6 pages.

R2-167586—Huawei, HiSilicon,"Slice Availability and Discovery in RAN," 3GPP TSG-RAN WG2 Meeting #96, Reno, Nevada, USA, Nov. 14-18, 2016, 3 pages.

Huawei, Key principles for Support of Network Slicing in RAN. 3GPP TSG-RAN WG3 Meeting #94 Reno, Nevada, US, Nov. 14-18, 2016, R3-162954, 5 pages.

Samsung et al, Update on network slicing interim agreements— RAN behaviour. SA WG2 Meeting #118 Nov. 14-18, 2016, Reno, USA, S2-167067, 4 pages.

Office Action issued in Chinese Application No. 201811603720.1 dated Aug. 22, 2019, 19 pages (With English Translation).

\* cited by examiner

COMMUNICATION METHOD, ACCESS NETWORK DEVICE, CORE NETWORK DEVICE, AND USER EQUIPMENT

CROSS-REFERENCE TO RELATED APPLICATIONS

This application is a continuation of International Application No. PCT/CN2018/071271, filed on Jan. 4, 2018, which claims priority to Chinese Patent Application No. 201710010762.3, filed on Jan. 6, 2017. The disclosures of the aforementioned applications are hereby incorporated by reference in their entireties.

TECHNICAL FIELD

Embodiments of the present invention relate to the communications field, and more specifically, to a communication method, an access network device, a core network device, and user equipment.

BACKGROUND

With rapid development of wireless communications technologies, a 5th generation (5th Generation, 5G for short) wireless communications technology currently has become a hot topic in the art. 5G supports a variety of application requirements, including: support of an access capability with higher-speed experience and higher bandwidth, information exchange with a lower latency and high reliability, access and management of massive machine type communication devices with low costs, and the like. In addition, 5G supports various vertical industry application scenarios, such as the Internet of Vehicles, emergency communications, and the industrial Internet. Due to these performance requirements and application scenarios of 5G, a 5G network needs to better meet a particular requirement of a user, and a customization capability of the 5G network needs to be further improved.

Therefore, an important concept, namely, a network slice, is introduced in 5G. An operator network may include a critical machine type communication (Critical Machine Type Communication, Critical MTC for short) network slice, a massive machine type communication (Massive Machine Type Communication, Massive MTC for short) network slice, and a mobile broadband (Mobile Broad Band, MBB for short) network slice.

When network slice instances are deployed in a network system, user equipment cannot aware these network slice instances.

SUMMARY

Embodiments of the present invention provide a communication method, an access network device, a core network device, and user equipment, so that the user equipment can aware a network slice instance.

According to a first aspect, a communication method is provided, including the following steps: receiving, by an access network device, first information sent by a core network device, where the first information includes information about a cell that supports a network slice instance and that allows or does not allow user equipment to access; and sending, by the access network device, the first information to the user equipment. In the foregoing process, the user equipment may obtain the information about a cell that supports a network slice instance and that allows or does not allow the user equipment to access, to aware the network slice instance. In addition, dedicated signaling is used in the foregoing process, so that signaling overheads can be reduced. Each user equipment supports a different network slice instance. As such, effective information can be provided by using dedicated signaling and based on a network slice instance supported by each UE, so that customization processing can be implemented on the user equipment. In addition, the user equipment does not need to aware the network slice instance due to an access failure, so that unnecessary requests such as a connection establishment request and a session request of the UE are avoided.

According to a second aspect, a communication method is provided, including the following steps: receiving, by user equipment, first information sent by an access network device, where the first information includes information about a cell that supports a network slice instance and that allows or does not allow the user equipment to access; and storing, by the user equipment, the first information.

With reference to the second aspect, in a possible design, the communication method further includes: selecting, by the user equipment based on the first information, a cell that supports a network slice instance and that allows the user equipment to access, to camp on.

With reference to the second aspect, in a possible design, the communication method further includes: determining, by the user equipment based on the first information, to perform data transmission in a cell that supports a network slice instance and that allows the user equipment to access.

With reference to the second aspect, in a possible design, the communication method further includes: attaching, by the user equipment based on the first information, to a cell that supports a network slice instance and that allows the user equipment to access, to trigger a service request.

According to a third aspect, a communication method is provided, including the following steps: sending, by a core network device, an initial context setup request to an access network device, where the initial context setup request includes first information, and the first information includes information about a cell that supports a network slice instance and that allows or does not allow user equipment to access; and receiving, by the core network device, an initial context setup request complete message.

According to a fourth aspect, an access network device is provided, including: a transceiver; a memory, configured to store an instruction; and a processor. The processor is separately connected to the memory and the transceiver, and is configured to execute the instruction stored in the memory, to perform the following steps when executing the instruction: receiving, by using the transceiver, first information sent by a core network device, where the first information includes information about a cell that supports a network slice instance and that allows or does not allow user equipment to access; and sending the first information to the user equipment by using the transceiver.

According to a fifth aspect, user equipment is provided, including: a transceiver; a memory, configured to store an instruction; and a processor. The processor is separately connected to the memory and the transceiver, and is configured to execute the instruction stored in the memory, to perform the following steps when executing the instruction: receiving, by using the transceiver, first information sent by an access network device, where the first information includes information about a cell that supports a network slice instance and that allows or does not allow the user equipment to access; and storing the first information by using the memory.

According to a sixth aspect, a core network device is provided, including: a transceiver; a memory, configured to store an instruction; and a processor. The processor is separately connected to the memory and the transceiver, and is configured to execute the instruction stored in the memory, to perform the following steps when executing the instruction: sending an initial context setup request by using the transceiver, where the initial context setup request includes first information, and the first information includes information about a cell that supports a network slice instance and that allows or does not allow user equipment to access; and receiving an initial context setup request complete message by using the transceiver.

According to a seventh aspect, a communication method is provided, including the following steps: receiving, by an access network device, first information sent by a core network device, where the first information includes information about a tracking area that supports a network slice instance and that allows or does not allow user equipment to access; and sending, by the access network device, the first information to the user equipment.

According to an eighth aspect, a communication method is provided, including the following steps: receiving, by user equipment, first information sent by an access network device, where the first information includes information about a tracking area that supports a network slice instance and that allows or does not allow the user equipment to access; and storing, by the user equipment, the first information.

According to a ninth aspect, a communication method is provided, including the following steps: sending, by a core network device, an initial context setup request to an access network device, where the initial context setup request includes first information, and the first information includes information about a tracking area that supports a network slice instance and that allows or does not allow user equipment to access; and receiving, by the core network device, an initial context setup request complete message.

According to a tenth aspect, an access network device is provided, including: a transceiver; a memory, configured to store an instruction; and a processor. The processor is separately connected to the memory and the transceiver, and is configured to execute the instruction stored in the memory, to perform the following steps when executing the instruction: receiving, by using the transceiver, first information sent by a core network device, where the first information includes information about a tracking area that supports a network slice instance and that allows or does not allow user equipment to access; and sending the first information to the user equipment by using the transceiver.

According to an eleventh aspect, user equipment is provided, including: a transceiver; a memory, configured to store an instruction; and a processor. The processor is separately connected to the memory and the transceiver, and is configured to execute the instruction stored in the memory, to perform the following steps when executing the instruction: receiving, by using the transceiver, first information sent by an access network device, where the first information includes information about a tracking area that supports a network slice instance and that allows or does not allow the user equipment to access; and storing the first information by using the memory.

According to a twelfth aspect, a core network device is provided, including: a transceiver; a memory, configured to store an instruction; and a processor. The processor is separately connected to the memory and the transceiver, and is configured to execute the instruction stored in the memory, to perform the following steps when executing the instruction: sending an initial context setup request by using the transceiver, where the initial context setup request includes first information, and the first information includes information about a tracking area that supports a network slice instance and that allows or does not allow user equipment to access; and receiving an initial context setup request complete message by using the transceiver.

With reference to any one of the foregoing aspects, in a possible design, the first information further includes information indicating that a network slice instance accessed by the user equipment is allowed to be switched to another network slice instance. Therefore, when a network slice instance is deployed by area, based on the information indicating that a network slice instance accessed by the user equipment is allowed to be switched to another network slice instance, continuity of an original data flow of the user equipment can be guaranteed as much as possible, and traffic flow interruption is avoided.

With reference to any one of the foregoing aspects, in a possible design, the network slice instance is determined by using network slice selection assistance information.

With reference to any one of the foregoing aspects, in a possible design, the network slice instance is determined by using a network slice instance identifier.

With reference to any one of the foregoing aspects, in a possible design, the access network device determines, by using the first information, a target access network device to which the user equipment is handed over.

According to another aspect of this application, a computer readable storage medium is provided. The computer readable storage medium stores an instruction. When the instruction runs on a computer, the computer executes the methods in the foregoing aspects.

According to another aspect of this application, a computer program product that includes an instruction is provided. When the instruction runs on a computer, the computer executes the methods in the foregoing aspects.

DESCRIPTION OF EMBODIMENTS

Figure 1A:
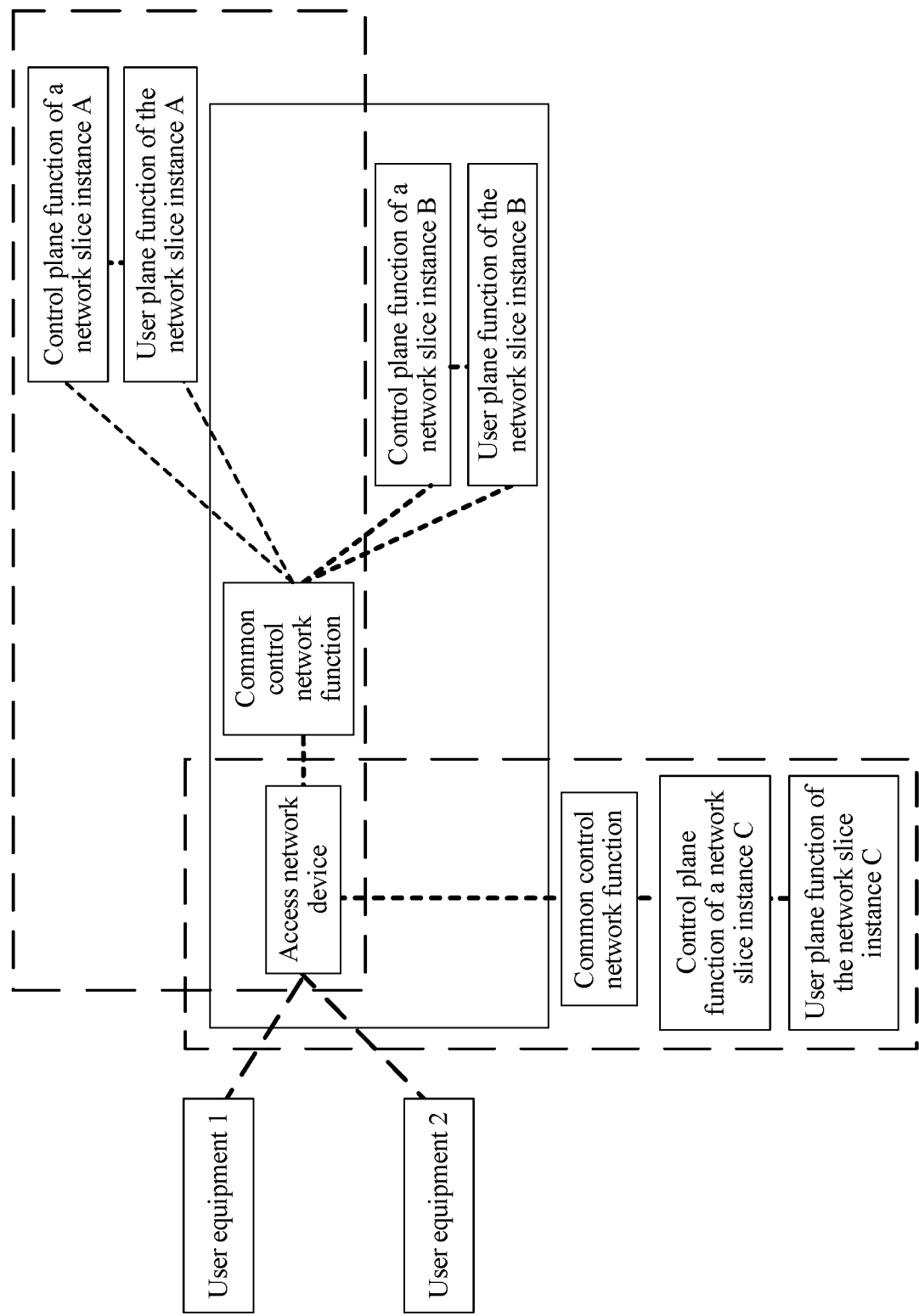
FIG. 1A is a schematic architectural diagram of a network system according to an embodiment of the present invention.

The following describes the technical solutions in the embodiments of the present invention with reference to the accompanying drawings in the embodiments of the present invention.

It should be understood that the technical solutions in the embodiments of the present invention may be applied to various communications systems, such as a Global System for Mobile Communications (Global System for Mobile Communications, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD) system, Universal Mobile Telecommunications System (Universal Mobile Telecommunications System, UMTS), a Worldwide Interoperability for Microwave Access (Worldwide Interoperability for Microwave Access, WiMAX) communications system, and a future 5G communications system.

The embodiments of the present invention relate to a network slicing technology. The network slicing technology logically abstracts a network as one or more network slices, and each network slice includes a series of logical network functions, to meet different requirements of different service types. For example, in a 5th generation (The 5th Generation, "5G" for short) mobile communications network, network slicing is an on-demand networking manner, and brings, to an operator, a new service that can be adjusted depending on a continuously changing user requirement and that can quickly meet a new application requirement.

The network slicing technology abstracts, based on scenario requirements, a physical infrastructure resource in the 5G network as a plurality of parallel network slice instances that are independent of each other. In each network slice instance, based on a requirement of a service scenario and a service model, a network function is customized and a corresponding network function is orchestrated. One network slice instance may be considered as one instantiated 5G network. In such a network structure, an operator can provide a network for a user as a service, and can freely combine entity networks based on indicators such as a speed, a capacity, coverage, a latency, reliability, security, and availability, to meet requirements of different users.

It should be noted that terms such as "network management architecture", "network system", and "system" in this specification are interchangeable. For ease of understanding, some terms in this specification are described first.

A network slice (Network slice) is a specific logical network that is customized based on a different service requirement on a physical or virtual network infrastructure. The network slice may be a complete network that includes an access network and a core network, can provide a telecommunications service, and has a network capability. The network slice may have one or more of the following characteristics: The access network may be sliced, or may not be sliced. The access network may be shared by a plurality of network slices.

A network slice instance (Network slice instance, NSI) is a really operating logical network, and can meet a network characteristic or service requirement. One network slice instance may provide one or more services. The network slice instance may be created from a network slice template, or may not be created from a network slice template.

The network slice template is a manner of generating the network slice instance, and is used to provide a reference for generating the network slice instance. The network slice template specifies how the network slice instance should be generated. For example, the network slice template may indicate which network function a network slice should include and which key performance indicator (Key Performance Indicators, KPI for short) the network slice should meet. The network slice template may define a network function that can provide a communications service and a network capability, and a logical expression of a resource corresponding to the network function.

FIG. 1A is a schematic architectural diagram of a network system according to an embodiment of the present invention. As shown in FIG. 1A, the network system includes at least two network slice instances, for example, a network slice instance A, a network slice instance B, and a network slice instance C. The network slice instance A includes a core network control plane network function used for the network slice instance A, a core network user plane network function used for the network slice instance A, a shared control plane function, and an access network device. The network slice instance B includes a core network control plane network function used for the network slice instance B, a core network user plane network function used for the network slice instance B, the shared control plane function, and the access network device. The network slice instance C includes a core network control plane network function used for the network slice instance C, a core network user plane network function used for the network slice instance C, the shared control plane function, and the access network device. These network slice instances may share some control plane functions, and the shared control plane functions are collectively referred to as common control network functions (Common Control Network functions, CCNF for short). The CCNF may include an access and mobility management function (Core Access and Mobility Management Function, AMF for short) and a network slice instance selection function. When UE initially accesses a network or performs a tracking area update (tracking area update, TAU for short), the UE provides slice selection assistance information (network slice selection assistance information, NSSAI), so that the network selects a slice instance of an access network part and a slice instance of a core network part. The NSSAI may include one or a plurality of session management-slice selection assistance information (session management-network slice selection assistance information, SM-NSSAI). A SM-NSSAI may be used to select a specific slice. The SM-NSSAI may include a slice/service type (Slice/service type, SST for short). The SST is used to indicate a particular feature and service type of a slice. The SM-NSSAI may further include a slice differentiator (Slice Differentiator, SD for short). The SD may further be used to distinguish between a plurality of network slice instances that have a same SST.

The user equipment may be separately connected to a core network control plane device and a core network user plane device by using the access network device. The user equipment may be a device such as a personal communications service (English: Personal Communication Service, PCS for short) phone, a cordless telephone set, a Session Initiation Protocol (English: Session Initial Protocol, SIP for short) phone, a wireless local loop (English: Wireless Local Loop, WLL for short) station, or a personal digital assistant (English: Personal Digital Assistant, PDA for short). The user equipment may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), or a terminal.

Figure 1B:
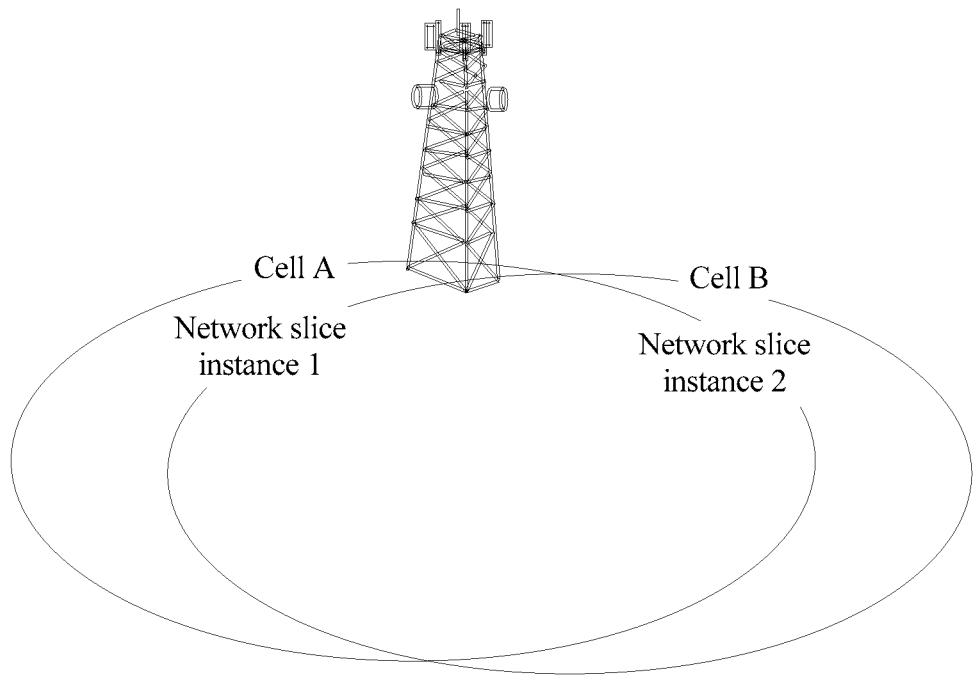
FIG. 1B is a schematic diagram in which a network slice is deployed by area.
Figure 1C:
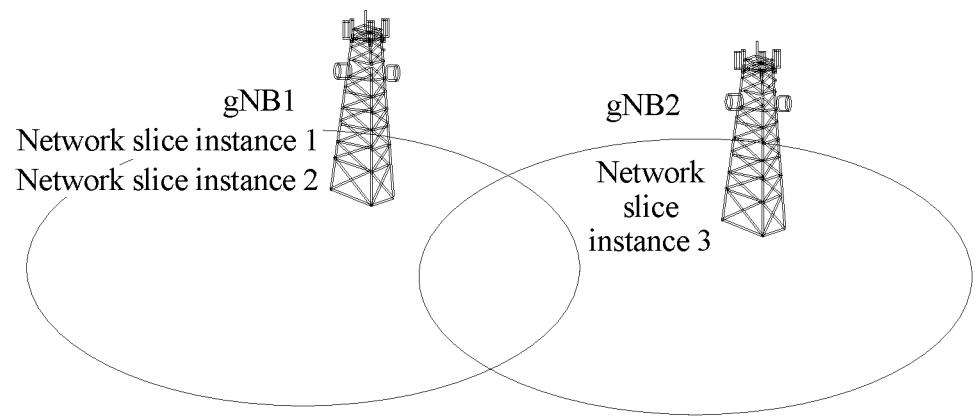
FIG. 1C is another schematic diagram in which a network slice is deployed by area.

Due to a deployment, a network slice is usually available only in a particular area. The area may be of a cell level, namely, the network slice is available in one or more cells. Alternatively, the area may be of a tracking area (Tracking Area, TA) level, namely, the network slice is available in one or more TAs. For example, in a shopping mall, an operator may deploy a network slice within a range of the shopping mall, to provide a service for a user within the range of the shopping mall. After leaving the shopping mall, the user is not served by the network slice. FIG. 1B is a schematic diagram in which a network slice is deployed by area. As shown in FIG. 1B, an access network device supports two cells, one cell A supports a network slice instance 1, and the other cell B supports a network slice instance 2. FIG. 1C is another schematic diagram in which a network slice is deployed by area. As shown in FIG. 1C, an access network device gNB1 supports a network slice instance 1 and a network slice 2, and another access network device gNB2 supports a network slice instance 3. The embodiments of the present invention intend to resolve a technical problem about how to enable UE to aware a network slice instance deployed by area. A solution is that each cell in a network broadcasts a slice instance supported by the cell, for example, broadcasts information about SM-NSSAI or an ID of the network slice instance supported by the cell. Another solution is as follows: Dedicated signaling is used to enable the UE to aware the network slice instance deployed by area, thereby reducing signaling overheads. The following uses FIG. 2, FIG. 3, and FIG. 7 as examples to describe how the UE aware the network slice instance deployed by area.

Figure 2:
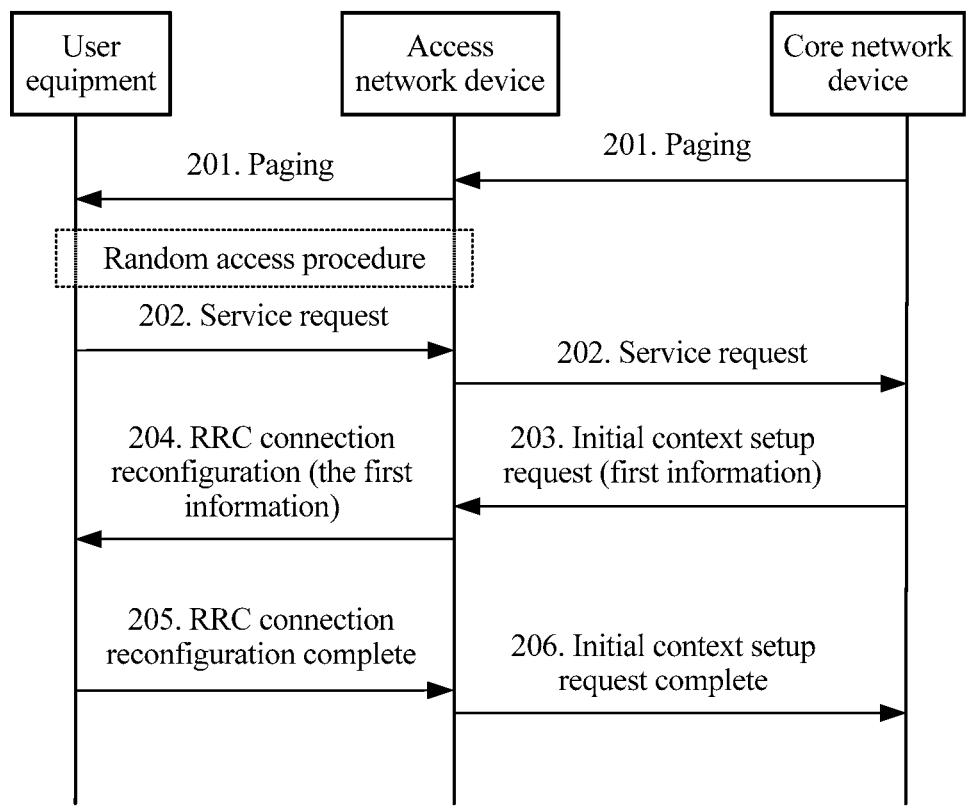
FIG. 2 is a schematic interaction diagram of a service request when user equipment is switched from an idle mode to a connected mode according to another embodiment of the present invention.

FIG. 2 is a schematic interaction diagram of a service request when user equipment is switched from an idle mode to a connected mode. As shown in FIG. 2, the service request process includes the following steps:

Step 201. A core network device triggers a paging process. The core network device sends a paging signal to the user equipment by using an access network device.

Step 202. The user equipment sends a service request to the access network device. The access network device sends a service request to the core network device.

Step 203. The core network device sends an initial context setup request to the access network device, where the request includes first information. After the access network device receives the initial context setup request, the access network device stores the first information.

Step 204. The access network device sends a radio resource control (Radio Resource Control, RRC for short) connection reconfiguration request to the user equipment, where the request includes the first information. The user equipment receives the RRC connection reconfiguration request, and after receiving the first information, the user equipment may store the first information.

Step 205. The user equipment sends an RRC connection reconfiguration complete message to the access network device, and the access network device receives the RRC connection reconfiguration complete message.

Step 206. The access network device sends an initial context setup request complete message to the core network device. The core network device receives the initial context setup request complete message.

The core network device may be a network element that includes an access and mobility management function, for example, an AMF entity. Optionally, before step 202, a random access procedure may be further included.

In the foregoing service request process, the access network device may obtain the first information. The first information may include network slice availability (Slice Availability) information. In an embodiment, the first information includes information about a cell that supports a network slice instance and that allows or does not allow the user equipment to access. The first information may also include information about a network slice instance that allows being accessed by the user equipment and another network slice instance that allows to be switched. In a case, the network slice instance is determined by using network slice selection assistance information.

Optionally, the first information may further include information about a public land mobile network (Public Land Mobile Network, PLMN for short) that allows or does not allow the UE to access. The first information may further include a data network name (Data Network Name, DNN for short) that allows or does not allow the UE to access.

The first information may be represented in a form of a list or an information set. Table 1 shows a first representation form of the first information. Table 1 may include an NSSAI list (NSSAI List). Each NSSAI in the NSSAI list may include the following content: information about a cell that allows access, information about a cell that does not allow access, and information about NSSAI that allows being switched. Information about each cell may include a PLMN ID and a cell identifier (Cell ID). Each NSSAI may include an NSSAI identifier (NSSAI ID). Table 1 may further include DNN information. Specifically, the NSSAI may be represented by using SM-NSSAI. On an SM-NSSAI granularity basis, differentiated processing and area-based processing may be implemented on different SM-NSSAI in a single network slice instance, and an operator can flexibly perform slice deployment by area.

TABLE 1

| Element name | Quantity of elements | Element explanation |
| --- | --- | --- |
| Serving public land mobile network SM-NSSAI list | A quantity of elements in the list is M1 | |
| >SM-NSSAI ID | | Includes a slice/service type and a slice differentiator |
| >List of cells that allow access | A quantity of elements in the list is N1 | |
| >>Public land mobile network ID | | |
| >>Cell ID | | |
| >List of cells that do not allow access | A quantity of elements in the list is N2 | |
| >>Public land mobile network ID | | |
| >>Cell ID | | |
| >List of SM-NSSAI that is switchable | A quantity of elements in the list is M2 | List of SM-NSSAI IDs that are allowed to be switched to SM-NSSAI |

TABLE 1-continued

| Element name | Quantity of elements | Element explanation |
| --- | --- | --- |
| >>ID of allowed SM-NSSAI >Data network name | | Includes a slice/service type and a slice differentiator |

Table 2 shows a second representation form of the first information. Table 2 may include information about a cell that allows access and information about a cell that does not allow access. Each cell that allows access may include the following content: a PLMN ID, a cell ID, and a corresponding NSSAI list. The NSSAI list may include an NSSAI ID and information about NSSAI that is switchable. Each cell that does not allow access may include the following content: a PLMN ID, a cell ID, and a corresponding NSSAI list. The NSSAI list may include an NSSAI ID. Table 2 may further include DNN information. Specifically, the NSSAI may be represented by using SM-NSSAI.

TABLE 2

| Element name | Quantity of elements | Element explanation |
| --- | --- | --- |
| Serving public land mobile network List of cells that allow access >Public land mobile network ID >Cell ID | A quantity of elements in the list is M1 | |
| >SM-NSSAI list | A quantity of elements in the list is N1 | |
| >>SM-NSSAI ID | | Includes a slice/service type and a slice differentiator |
| >>List of SM-NSSAI that is switchable | A quantity of elements in the list is N2 | List of SM-NSSAI IDs that are allowed to be switched to SM-NSSAI |
| >>>ID of allowed SM-NSSAI >Data network name | | Includes a slice/service type and a slice differentiator |
| List of cells that do not allow access >Public land mobile network ID >Cell ID | A quantity of elements in the list is M2 | |
| >SM-NSSAI list | A quantity of elements in the list is N3 | |
| >>SM-NSSAI | | Includes a slice/service type and a slice differentiator |

In another embodiment, the first information includes information about a tracking area (Tracking area, TA for short) that supports a network slice instance and that allows or does not allow the user equipment to access. The first information may further include information indicating that a network slice instance accessed by the user equipment is allowed to be switched to another network slice instance. The network slice instance is determined by using network slice selection assistance information. Optionally, the first information may further include information about a public land mobile network (Public Land Mobile Network, PLMN for short) that allows or does not allow the UE to access. The first information may further include information about a DNN that allows or does not allow the UE to access.

Table 3 shows a third representation form of the first information. Table 3 may include an NSSAI list (NSSAI List). Each NSSAI in the NSSAI list may include the following content: information about a TA that allows access, information about a TA that does not allow access, and information about NSSAI that is allowed to be switched. Information about each TA may include a PLMN ID and a cell identifier (Cell ID). Each NSSAI may include an NSSAI identifier (NSSAI ID). Table 3 may further include DNN information. Specifically, the NSSAI may be represented by using SM-NSSAI.

TABLE 3

| Element name | Quantity of elements | Element explanation |
| --- | --- | --- |
| Serving public land mobile network SM-NSSAI list | A quantity of elements in the list is M1 | |
| >SM-NSSAI ID | | Includes a slice/service type and a slice differentiator |
| >List of tracking areas that allow access >>Public land mobile network ID >>Tracking area ID | A quantity of elements in the list is N1 | |
| >List of tracking areas that do not allow access >>Public land mobile network ID >>Tracking area ID | A quantity of elements in the list is N2 | |
| >List of SM-NSSAI that is switchable | A quantity of elements in the list is M2 | List of SM-NSSAI IDs that are allowed to be switched to SM-NSSAI |
| >>ID of allowed SM-NSSAI >Data network name | | Includes a slice/service type and a slice differentiator |

Table 4 shows a fourth representation form of the first information. Table 4 may include a tracking area list. The tracking area list may include information about a tracking area that allows access and information about a tracking area that does not allow access. Each tracking area that allows access may include the following content: a PLMN ID, a TA ID, and a corresponding NSSAI list. The NSSAI list may include an NSSAI ID and information about NSSAI that is switchable. Each tracking area that does not allow access may include the following content: a PLMN ID, a TA ID, and a corresponding NSSAI list. The NSSAI list may include an NSSAI ID. Specifically, the NSSAI may be represented by using SM-NSSAI.

TABLE 4

| Element name | Quantity of elements | Element explanation |
| --- | --- | --- |
| Serving public land mobile network List of tracking areas that allow access >Public land mobile network ID >Tracking area ID | A quantity of elements in the list is M1 | |
| >SM-NSSAI list | A quantity of elements in the list is N1 | |
| >>SM-NSSAI ID | | Includes a slice/service type and a slice differentiator |
| >>List of SM-NSSAI that is switchable | A quantity of elements in the list is N2 | List of SM-NSSAI IDs that are allowed to be switched to SM-NSSAI |
| >>>ID of allowed SM-NSSAI >Data network name | | Includes a slice/service type and a slice differentiator |

TABLE 4-continued

| Element name | Quantity of elements | Element explanation |
|---|---|---|
| List of tracking areas that do not allow access | A quantity of elements in the list is M2 | |
| >Public land mobile network ID | | |
| >Tracking area ID | | |
| >SM-NSSAI list | A quantity of elements in the list is N3 | |
| >>SM-NSSAI | | Includes a slice/service type and a slice differentiator |

Table 1 and Table 2 use a cell-based granularity, so that a network has good deployment flexibility. Table 3 and Table 4 use a TA-based granularity, so that a network slice can be deployed in a larger area.

In Table 1 to Table 4, the network slice instance is determined by using the network slice selection assistance information. It should be noted that the network slice instance may alternatively be determined by using a network slice instance identifier. This may be implemented by replacing the NSSAI in Table 1 to Table 4 is correspondingly with the network slice instance (Slice Instance). When the network slice instance is determined by using the network slice instance identifier, signaling overheads may be reduced.

Table 5 shows a fifth representation form of the first information. Table 5 is corresponding to Table 1. Table 5 may include a network slice instance list (Slice Instance List). Each network slice instance in the slice instance list may include the following content: information about a cell that allows access, information about a cell that does not allow access, and information about a network slice instance that is switchable. Information about each cell may include a PLMN ID and a cell identifier (Cell ID). The information about the network slice instance that is switchable may include an identifier (ID) of the network slice instance that is switchable.

TABLE 5

| Element name | Quantity of elements | Element explanation |
|---|---|---|
| Serving public land mobile network | | |
| Slice ID list | A quantity of elements in the list is M1 | |
| >Slice ID | | Identifier of a slice instance |
| >List of cells that allow access | A quantity of elements in the list is N1 | |
| >>Public land mobile network ID | | |
| >>Cell ID | | |
| >List of cells that do not allow access | A quantity of elements in the list is N2 | |
| >>Public land mobile network ID | | |
| >>Cell ID | | |
| >List of slices that are switchable | A quantity of elements in the list is M2 | |
| >>ID of a allowed slice | | Identifier of a slice instance |
| >Data network name | | |

The first information may alternatively be represented by using a RAN notification area (RAN notification area) ID. For example, the cell ID or the tracking area ID is replaced with the RAN notification area ID.

The first information may be referred to as slice-related mobility information. When the first information is represented in a form of a table, the first information may also be referred to as a slice-related mobility list, and the first information may be used as a part of a user equipment context. Based on the slice-related mobility list, the following behavior of the UE is decided, for example, the UE is allowed or is not allowed to access a cell, data transmission behavior, or handover behavior. Using dedicated signaling of the UE ensures that the UE can aware area-based slice deployment, so that signaling overheads are reduced.

Figure 3:
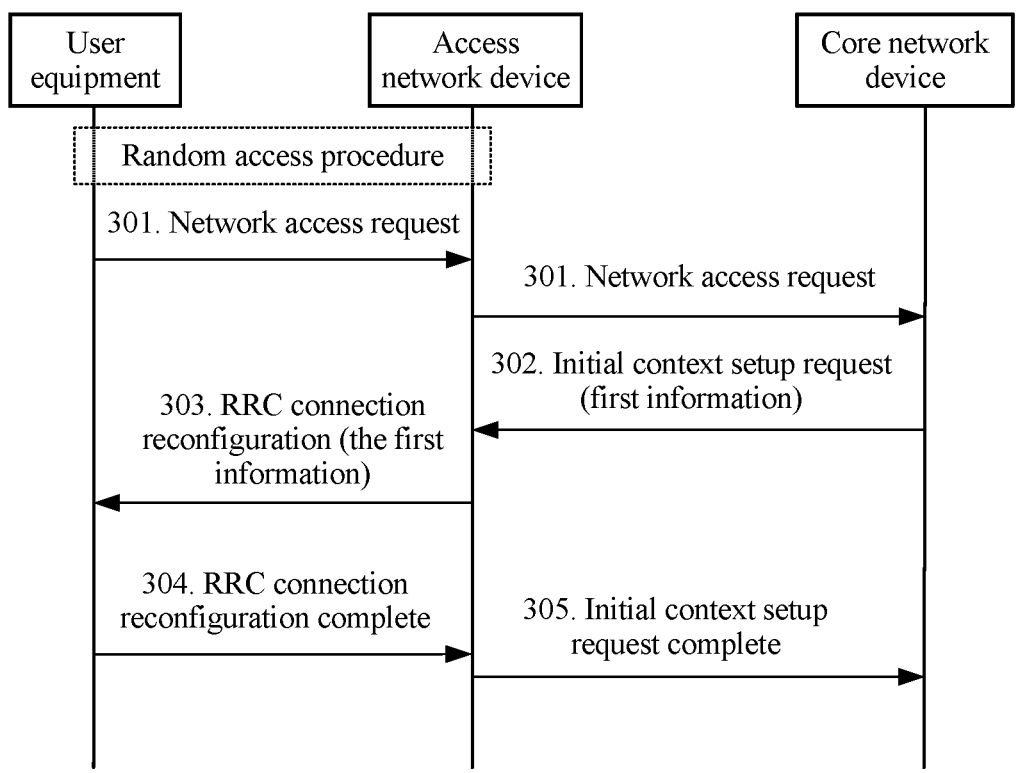
FIG. 3 is a schematic interaction diagram in which user equipment accesses a network according to another embodiment of the present invention.

It should be noted that the access network device and the user equipment may further obtain the first information by using another procedure, for example, may obtain the first information by using a procedure in which the user equipment accesses (Attach) a network. FIG. 3 is a schematic interaction diagram in which user equipment accesses a network. The user equipment and an access network device may also obtain first information by using an attach procedure. As shown in FIG. 3, that user equipment accesses a network specifically includes the following steps:

Step 301. The user equipment sends a network access request to the access network device. The access network device sends a network access request to a core network device.

Step 302. The core network device sends an initial context setup request to the access network device, where the request includes the first information. For description of the first information, refer to the foregoing description. The access network device receives the information and stores the first information.

Step 303. The access network device sends an RRC connection reconfiguration request to the user equipment, where the request includes the first information.

Step 304. The user equipment sends an RRC connection reconfiguration complete message to the access network device.

Step 305. The access network device sends an initial context setup request complete message to the core network device.

Optionally, before step 301, a random access procedure may be further included.

After obtaining the first information, the user equipment may store the first information. For the UE in a various state, some operations are performed based on the first information. The following describes how the first information is used for user equipment in various states.

For connected user equipment (connected UE), when the UE is handed over, a serving cell/base station uses the first information as one of factors to determine a specific cell to which the UE is handed over or a specific cell, in a specific TA, to which the UE is handed over. For example, the access network device uses the first information as one of factors to select a target access network device for the UE. In addition, the access network device uses the first information as a part of a user equipment context (UE context), and transfers the first information to the target access network device in a handover process.

Figure 4A:
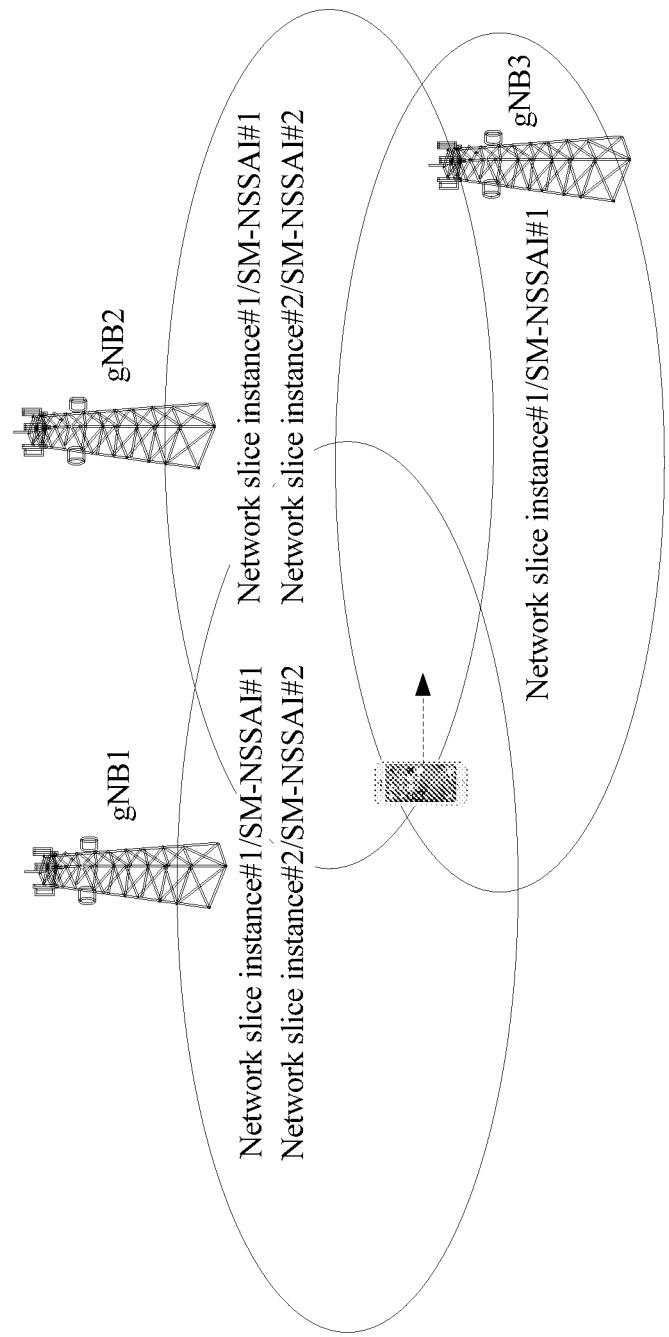
FIG. 4A is a schematic diagram of a mobility scenario according to an embodiment of the present invention.

FIG. 4A is a schematic diagram of a mobility scenario according to an embodiment of the present invention. As shown in FIG. 4A, an access network device gNB1 supports a network slice instance #1 and a network slice instance #2, and an access network device gNB2 supports same types of network slice instances as the access network device gNB1. However, an access network device gNB3 supports only the network slice instance #1. Alternatively, the access network device gNB1 supports SM-NSSAI #1 and SM-NSSAI #2, and the access network device gNB2 also supports the SM-NSSAI #1 and the SM-NSSAI #2, but the access network device gNB3 supports only the SM-NSSAI #1.

When other conditions (such as a measurement result reported by UE and a load status) are the same or similar, the access network device gNB1 preferably hands over the UE to the access network device gNB2 that supports two network slice instances or two SM-NSSAIs. In another case, for example, when the measurement result reported by the UE indicates that the gNB3 has best network quality, the gNB1 hands over the UE to the gNB3. In addition, the gNB1 determines, based on first information, whether the SM-NSSAI #2 supported by the source access network device gNB1 is allowed to be switched to the SM-NSSAI #1 supported by the gNB3, to use related configurations of the SM-NSSAI #1. If the SM-NSSAI #2 is allowed to be switched to the SM-NSSAI #1, the gNB1 performs switching from the SM-NSSAI #2 to the SM-NSSAI #1, and notifies the UE. Otherwise, the gNB1 refuses a request for switching the SM-NSSAI #2, and notifies the UE. Alternatively, the gNB1 determines, based on first information, whether the network slice instance #2 supported by the source access network device gNB1 is allowed to be switched to the network slice instance #1 supported by the gNB3, to use related configurations of the network slice instance #1. If the network slice instance #2 is allowed to be switched to the network slice instance #1, the gNB1 performs switching from the network slice instance #2 to the network slice instance #1, and notifies the UE; or otherwise, the gNB1 refuses a request for switching the network slice instance #2, and notifies the UE.

Figure 4B:
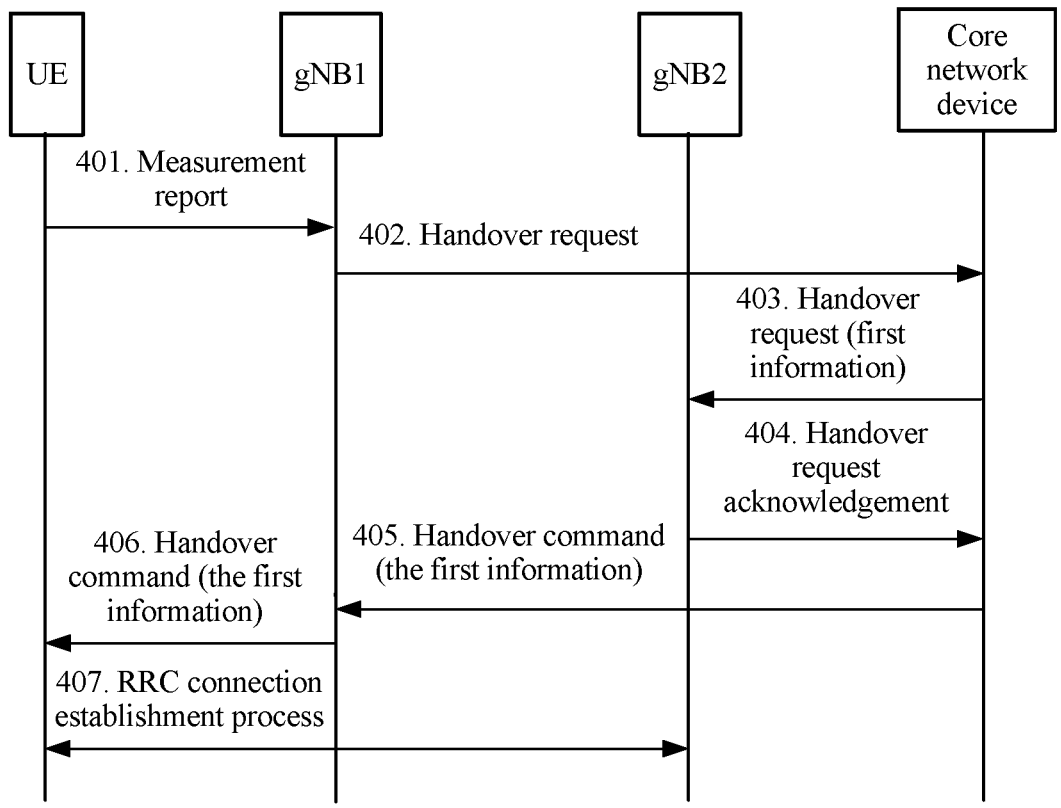
FIG. 4B is a schematic interaction diagram in which user equipment is handed over according to another embodiment of the present invention.

FIG. 4B is a schematic interaction diagram in which user equipment is handed over by using an interface (such as an NG2 interface) between an access network device and a core network device. In the handover process, a target access network device may obtain first information, and the user equipment obtains updated first information. As shown in FIG. 4B, the handover process specifically includes the following steps:

Step 401. The user equipment sends a measurement report to an access network device gNB1.

Step 402. The access network device gNB1 selects a gNB2 as the target access network device of the user equipment based on stored first information of the user equipment, and sends a handover request to the core network device. Before step 402, the access network device gNB1 and the access network device gNB2 may exchange information about NSSAI (which may be specifically SM-NSSAI) respectively supported by the access network device gNB1 and the access network device gNB2 or IDs of network slice instances respectively supported by the access network device gNB1 and the access network device gNB2.

Step 403. The core network device sends a handover request to the access network device gNB2, where the request includes first information.

Step 404. The access network device gNB2 sends a handover request acknowledgement (Handover Request Ack) to the core network device.

Step 405. The core network device sends a handover command to the access network device gNB1, where the command includes the first information.

Step 406. The access network device gNB1 sends a handover command to the user equipment, where the command includes the first information. The handover command may be sent by using an RRC connection reconfiguration message.

Step 407. The user equipment starts a process of establishing an RRC connection to the access network device gNB2.

Figure 5:
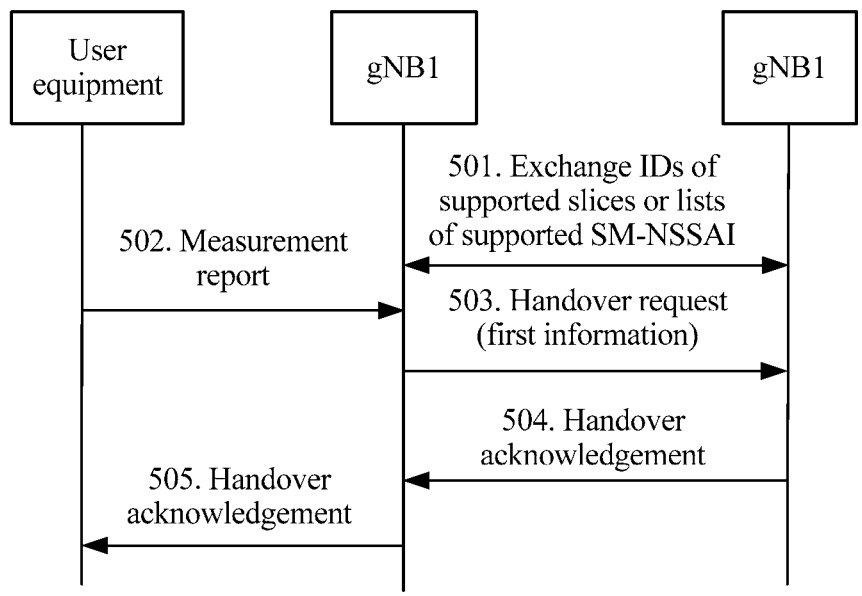
FIG. 5 is a schematic interaction diagram in which user equipment is handed over according to another embodiment of the present invention.

FIG. 5 is a schematic interaction diagram in which user equipment is handed over by using an interface (such as an Xn interface) between access network devices. In the handover process, a source access network device gNB1 determines, based on first information, a target base station to which the user equipment is to be handed over, and transfers the first information to the target access network device by using the Xn interface. As shown in FIG. 5, the handover process specifically includes the following steps:

Step 501. The access network device gNB1 and an access network device gNB2 exchange information about NSSAI (which may be specifically SM-NSSAI) respectively supported by the access network device gNB1 and the access network device gNB2 or IDs of network slice instances respectively supported by the access network device gNB1 and the access network device gNB2.

Step 502. The user equipment sends a measurement report to the access network device gNB1.

Step 503. The access network device gNB1 determines, based on stored first information of the user equipment, whether an ongoing slice service of the user equipment is allowed to be switched to a slice instance supported by the access network device gNB2. If the ongoing slice service is allowed to be switched to the slice instance supported by the access network device gNB2, selects the gNB2 as the target access network device of the user equipment, and sends a handover request to access network device gNB2. The request includes the first information.

Step 504. The access network device gNB2 sends a handover request acknowledgement (Handover Request Ack) to the access network device gNB1.

Step 505. The access network device gNB1 sends a handover command to the user equipment. The handover command may be sent by using an RRC connection reconfiguration message.

For connected user equipment, the core network device may further determine, based on the first information, whether the user equipment can roam to another operator.

For inactive (inactive) user equipment, the core network device stores user equipment context information, and the access network device also stores the user equipment context information. In a movement process of the user equipment, the user equipment takes the first information into consideration to determine whether the user equipment can continue performing data transmission (such as small packet transmission).

When the inactive user equipment moves from coverage of the access network device gNB1 shown in FIG. 4A to coverage of the access network device gNB2, the user equipment may decide data transmission behavior of the user equipment based on the first information. Specifically, when the user equipment finds, based on the first information, that the SM-NSSAI #2 is allowed to be switched to the SM-NSSAI #1, the user equipment is handed over from the SM-NSSAI #2 to the SM-NSSAI #1, that is, uses a configuration parameter of the SM-NSSAI #1 (which includes a same logical channel priority) to continue transmitting a service of the SM-NSSAI #2. Otherwise, the user equipment stops corresponding data transmission of the SM-NSSAI #2, and continues to transmit a service of the SM-NSSAI #1.

Figure 6:
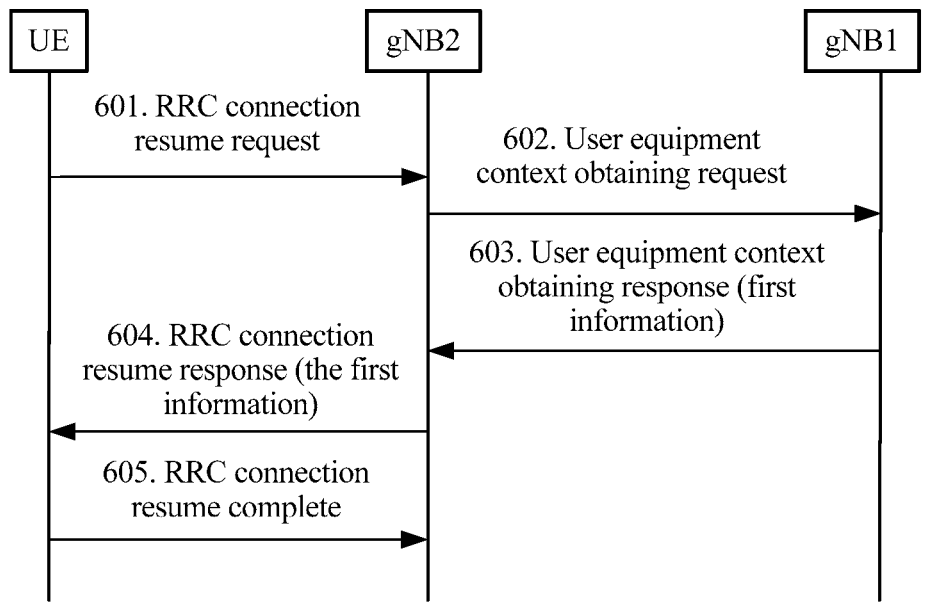
FIG. 6 is a schematic interaction diagram of state transition of inactive user equipment according to another embodiment of the present invention.

When the inactive user equipment moves from the coverage of the access network device gNB1 in FIG. 4A to the coverage of the access network device gNB2, the access network device may also decide the data transmission behavior of the user equipment based on the first information. Specifically, the user equipment triggers a state transition request, and the access network device determines whether data of the SM-NSSAI #2 can be switched to the SM-NSSAI #1 for transmission. FIG. 6 is a schematic interaction diagram of state transition of inactive user equipment. As shown in FIG. 6, the state transition includes the following steps:

Step 601. The user equipment sends an RRC connection resume request to an access network device.

Step 602. The access network device gNB2 sends a user equipment context obtaining request to an access network device gNB1.

Step 603. The access network device gNB1 sends a user equipment context obtaining response to the access network device gNB2, where the response includes first information. The access network device gNB2 may find, based on the first information, whether an ongoing session of the user equipment that is based on SM-NSSAI #2 can be switched to a session that is based on SM-NSSAI #1.

Step 604. The access network device gNB2 sends an RRC connection resume response to the user equipment, where the response includes the first information. If it is found, based on the first information, that the user equipment is allowed to be handed over from the SM-NSSAI #2 to the SM-NSSAI #1, the user equipment uses a configuration parameter (which includes a same logical channel priority) of the SM-NSSAI #1 to continue transmitting a service of the SM-NSSAI #2; or otherwise, the user equipment stops transmitting a service of the SM-NSSAI #2.

Step 605. The user equipment sends an RRC connection resume complete to the access network device gNB1.

If UE that receives the first information enters an idle mode, the UE also uses the first information to perform a subsequent operation. For example, when the UE performs cell reselection, and the UE finds that a highest-priority inter-frequency (inter-frequency) cell or a highest-level intra-frequency (intra-frequency) cell of the UE is a cell that supports a network slice instance and that does not allow access, the UE cannot use the cell as a candidate cell within a first time T1. After the first time T1 expires, if the UE still cannot select a suitable cell to camp on, the restriction is canceled. When the UE has left a slice deployment area for a time period, the UE may delete the first information. The UE may further use the first information to attach to a suitable cell, to trigger a service request of a network slice supported by the cell.

The foregoing uses examples to provide description about obtaining the first information by the access network device and the user equipment. It should be noted that the access network device and the user equipment may obtain the first information in another manner. For example, for the connected UE, the core network device also notifies a serving (serving) access network device of the first information through context setup, S1/X2 handover, and sending of NAS downlink signaling. In a tracking area update procedure of the user equipment, the UE and the access network device may also obtain the first information. The UE may also obtain the first information by using an RRC connection release message, so that the UE is redirected to a cell that supports NSSAI or a network slice instance ID.

Figure 7:
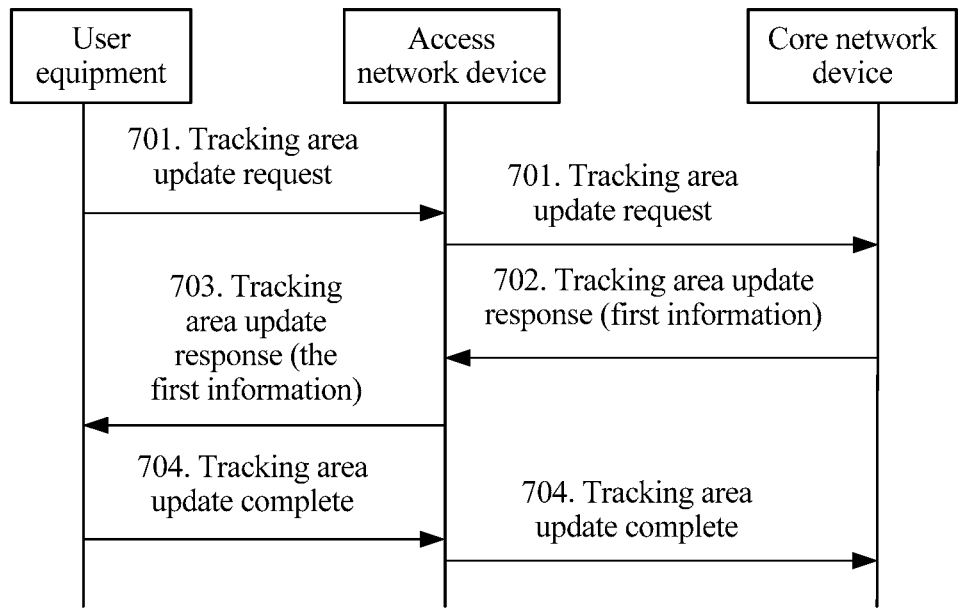
FIG. 7 is a schematic diagram of a tracking area update procedure of user equipment according to another embodiment of the present invention.

FIG. 7 is a schematic diagram of a tracking area update procedure of user equipment. As shown in FIG. 7, the procedure includes the following steps:

Step 701. The user equipment sends a tracking area update request to an access network device. The access network device sends the tracking area update request to a core network device.

Step 702. The core network device sends a tracking area update response to the access network device, where the response includes first information. The access network device stores the first information.

Step 703. The access network device sends a tracking area update response to the user equipment, where the response includes the first information.

Step 704. The UE sends a tracking area update complete message to the access network device. The access network device sends a tracking area update complete message to the core network device.

In the foregoing description, the access network device and the UE obtain the first information by using dedicated signaling of the UE, so that signaling overheads can be reduced. It should be noted that the first information may be broadcast, so that the UE obtains the first information. In this case, the first information may include information about NSSAI that is supported or not supported by a cell or an ID of a network slice instance that is supported or not supported by the cell, and further includes information about NSSAI that is supported or not supported by another cell or an ID of a network slice instance that is supported or not supported by the another cell. Alternatively, the first information may include information about NSSAI that is supported or not supported by a tracking area level or an ID of a network slice instance that is supported or not supported by the tracking area level, and further includes information about NSSAI that is supported or not supported by another tracking area level or an ID of a network slice instance that is supported or not supported by the another tracking area level.

In the embodiments of the present invention, the access network device and the user equipment may obtain the first information. By using the first information, idle UE can select a suitable cell to camp on a network, so that the UE can attach to a cell that supports a network slice instance. Connected UE can be handed over to a suitable target cell; and inactive UE can continue transmitting data in a target cell of the UE. Therefore, impact of area-based slice deployment on the UE and the network can be avoided. In this way, the UE can better aware area-based network deployment, a slice is visible to the UE, unnecessary cell access, handover, roaming, and the like are avoided, and UE experience is improved.

Figure 8:
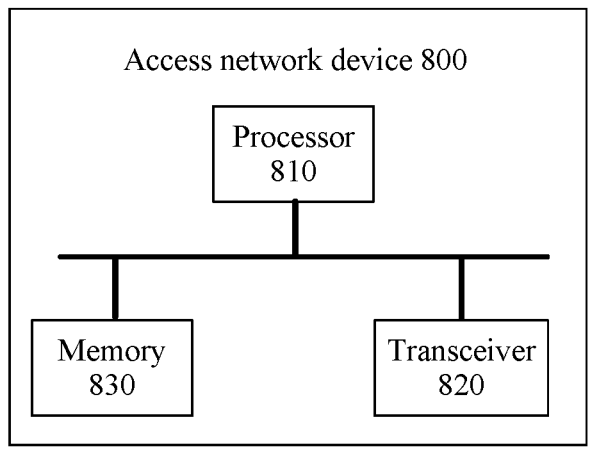
FIG. 8 is a schematic diagram of an access network device according to an embodiment of the present invention.
Figure 9:
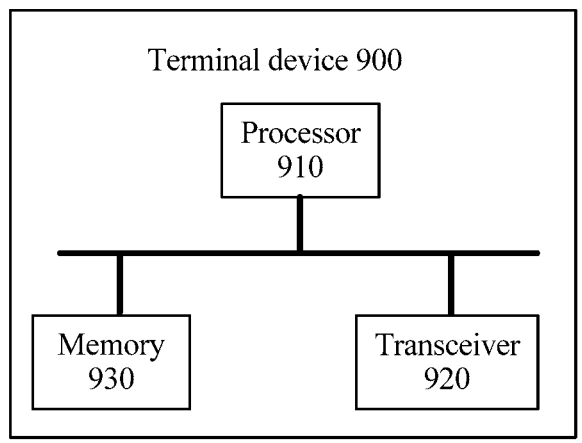
FIG. 9 is a schematic diagram of user equipment according to an embodiment of the present invention.
Figure 10:
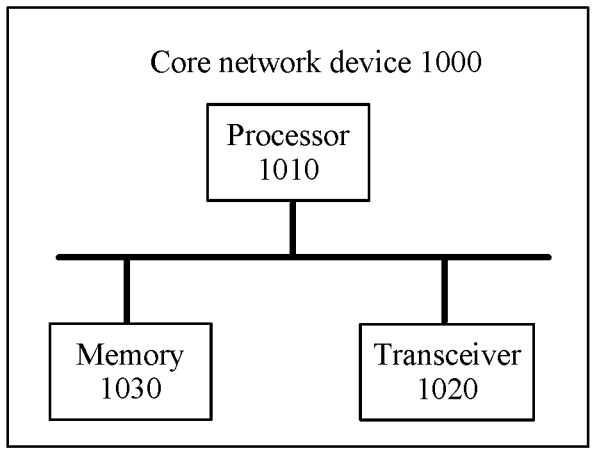
FIG. 10 is a schematic diagram of a core network device according to an embodiment of the present invention.

With reference to FIG. 1 to FIG. 7, the foregoing describes in detail the communication method according to the embodiments of the present invention. With reference to FIG. 8 to FIG. 10, the following describes in detail an access network device, user equipment, and a core network device according to the embodiments of the present invention.

FIG. 8 is a schematic diagram of an access network device according to an embodiment of the present invention. The access network device includes a processor 810, a transceiver 820, and a memory 830. The processor 810 is separately connected to the transceiver 820 and the memory 830. The memory 830 is configured to store an instruction. The processor 810 is configured to execute the instruction stored in the memory 830, to control the transceiver 820 to send a signal and/or receive a signal. Specifically, the processor 810 may control the transceiver 820 to perform receiving and sending steps performed by the access network device in the embodiments shown in FIG. 2 to FIG. 7.

For details, refer to a corresponding process in the foregoing method embodiments. Details are not described herein again.

FIG. 9 is a schematic diagram of user equipment according to an embodiment of the present invention. The user equipment includes a processor 910, a transceiver 920, and a memory 930. The processor 910 is separately connected to the transceiver 920 and the memory 930. The memory 930 is configured to store an instruction. The processor 910 is configured to execute the instruction stored in the memory 930, to control the transceiver 920 to send a signal and/or receive a signal. Specifically, the processor 910 may control the transceiver 920 to perform receiving and sending steps performed by the user equipment in the embodiments shown in FIG. 2 to FIG. 7. The processor 910 may control the memory 930 to store first information. For details, refer to a corresponding process in the foregoing method embodiments. Details are not described herein again.

FIG. 10 is a schematic diagram of a core network device according to an embodiment of the present invention. The core network device includes a processor 1010, a transceiver 1020, and a memory 1030. The processor 1010 is separately connected to the transceiver 1020 and the memory 1030. The memory 1030 is configured to store an instruction. The processor 1010 is configured to execute the instruction stored in the memory 1030, to control the transceiver 1020 to send a signal and/or receive a signal. Specifically, the processor 1010 may control the transceiver 1020 to perform receiving and sending steps performed by the core network device in the embodiments shown in FIG. 2 to FIG. 7. For details, refer to a corresponding process in the foregoing method embodiments. Details are not described herein again.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

A person of ordinary skill in the art may be aware that units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

To make the application document brief and clear, the foregoing technical features and descriptions in an embodiment may be considered to be applicable to other embodiments, and are not described in other embodiments again.

The foregoing descriptions are only specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
  receiving, by an access network device, downlink non-access stratum (NAS) signaling from a core network device, wherein the downlink NAS signaling comprises first information, and the first information comprises an identifier of allowed session management-network slice selection assistance information; and
  storing, by the access network device, the first information.

2. The communication method according to claim 1, wherein
  the first information further comprises information about a tracking area that user equipment is allowed to access.

3. The communication method according to claim 1, wherein the first information further comprises information about a tracking area that user equipment is not allowed to access.

4. The communication method according to claim 1, wherein the first information further comprises information about a public land mobile network that user equipment is allowed to access.

5. The communication method according to claim 1, wherein the session management-network slice selection assistance information comprises a slice/service type.

6. The communication method according to claim 5, wherein the session management-network slice selection assistance information further comprises a slice differentiator.

7. An access network device, comprising:
a receiver, configured to receive downlink non-access stratum (NAS) signaling from a core network device, wherein the downlink NAS signaling comprises first information, and the first information comprises an identifier of allowed session management-network slice selection assistance information;
a non-transitory memory storage comprising instructions; and
one or more hardware processors in communication with the non-transitory memory storage, wherein the one or more hardware processors execute the instructions to store the first information.

8. The access network device according to claim 7, wherein
the first information further comprises information about a tracking area that user equipment is allowed to access.

9. The access network device according to claim 7, wherein the first information further comprises information about a tracking area that user equipment is not allowed to access.

10. The access network device according to claim 7, wherein the first information further comprises information about a public land mobile network that user equipment is allowed to access.

11. The access network device according to claim 7, wherein the session management-network slice selection assistance information comprises a slice/service type.

12. The access network device according to claim 11, wherein the allowed session management-network slice selection assistance information further comprises a slice differentiator.

13. A non-transitory computer-readable medium storing computer instructions, that when executed by one or more hardware processors, cause an access network device to perform operations comprising:
receiving downlink non-access stratum (NAS) signaling from a core network device, wherein the downlink NAS signaling comprises first information, and the first information comprises an identifier of allowed session management-network slice selection assistance information; and
storing the first information.

14. The non-transitory computer-readable medium according to claim 13, wherein the first information further comprises information about a tracking area that user equipment is allowed to access.

15. The non-transitory computer-readable medium according to claim 13, wherein the first information further comprises information about a tracking area that user equipment is not allowed to access.

16. The non-transitory computer-readable medium according to claim 13, wherein the first information further comprises information about a public land mobile network that user equipment is allowed to access.

17. The non-transitory computer-readable medium according to claim 13, wherein the allowed session management-network slice selection assistance information comprises a slice/service type.

18. The non-transitory computer-readable medium according to claim 17, wherein the allowed session management-network slice selection assistance information further comprises a slice differentiator.

* * * * *